R. JANNEY.
VARIABLE SPEED TRANSMISSION DEVICE.
APPLICATION FILED JULY 9, 1906.
924,787.
Patented June 15, 1909.
6 SHEETS—SHEET 1.
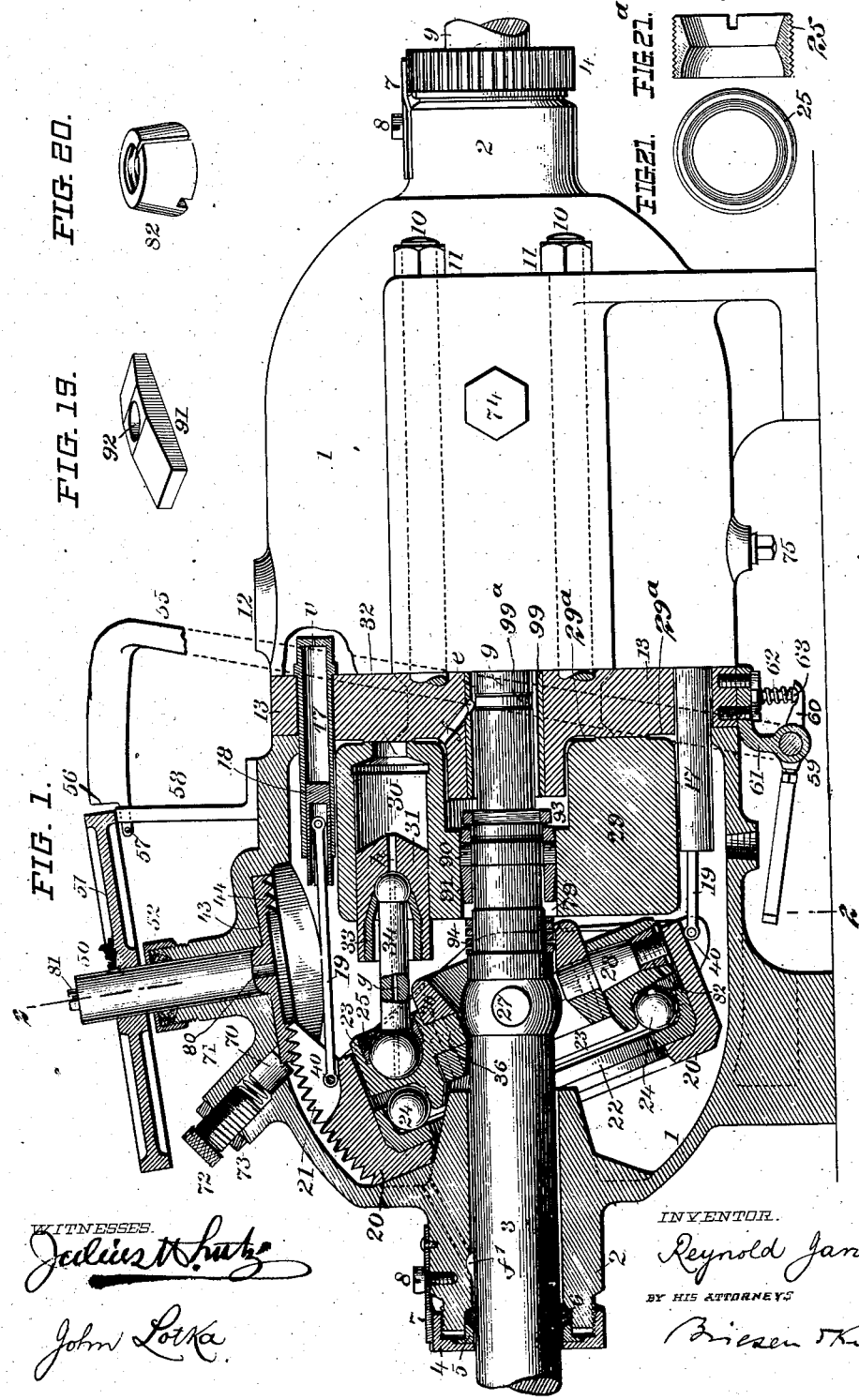
WITNESSES.
INVENTOR.
Reynold Janney
BY HIS ATTORNEYS

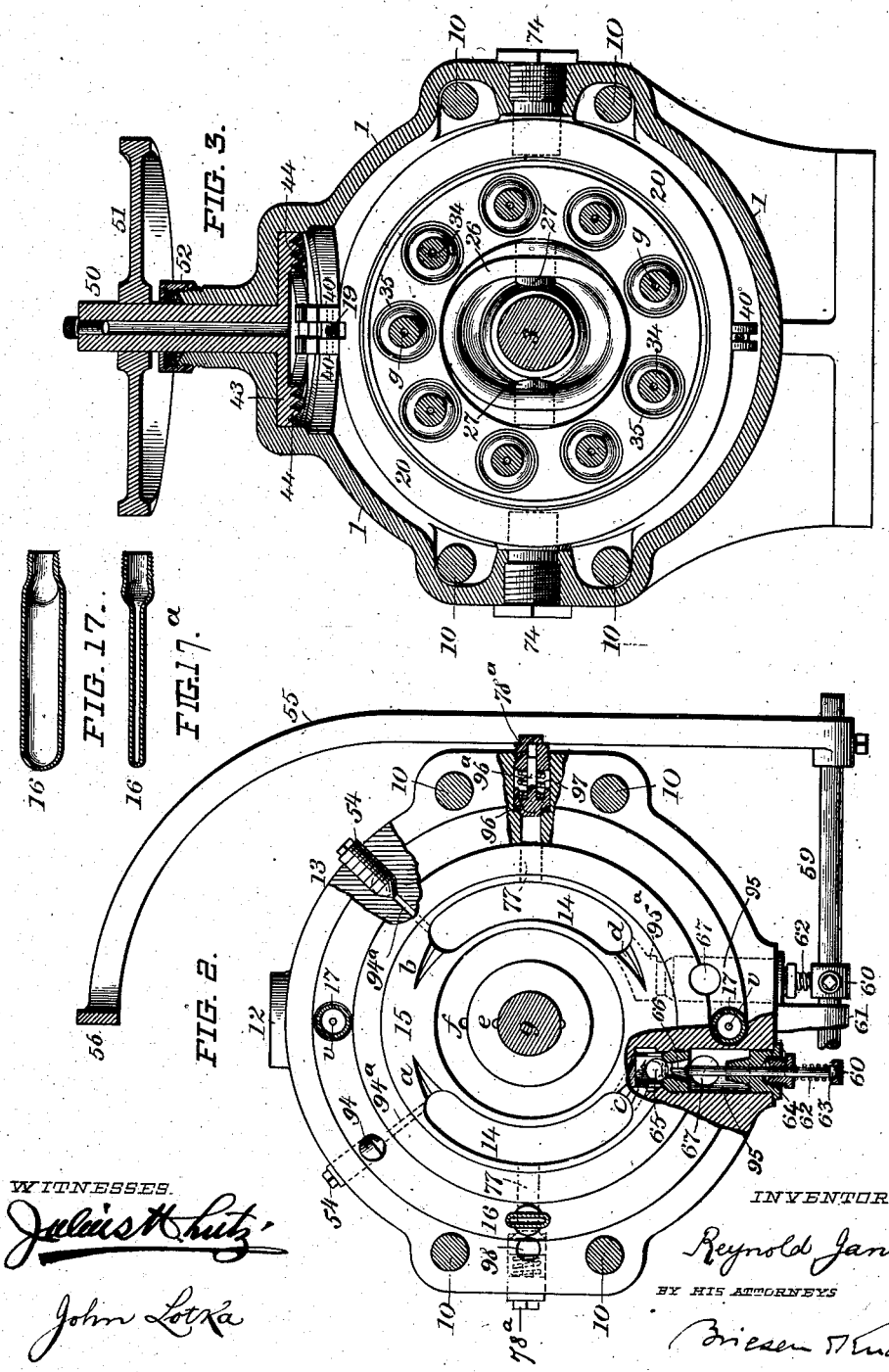

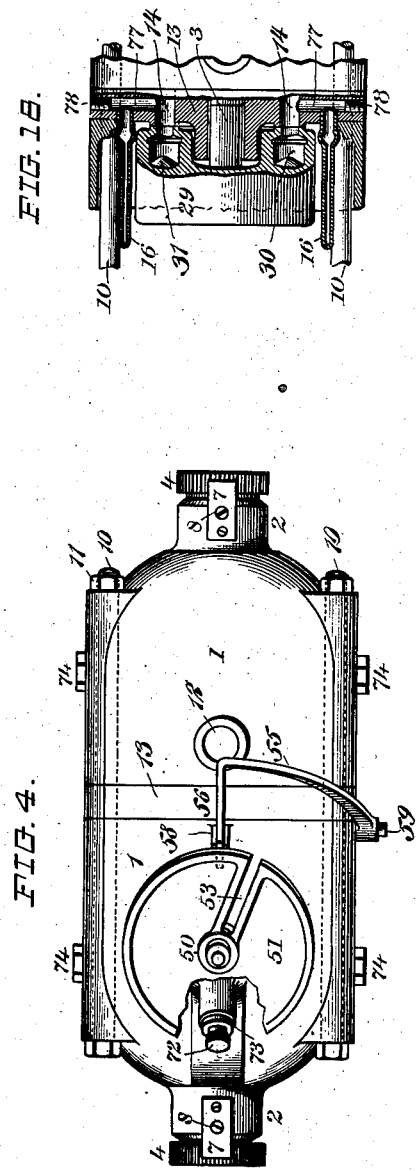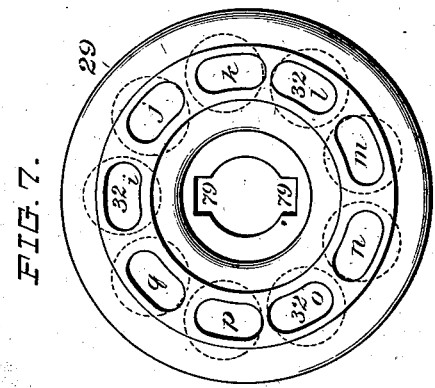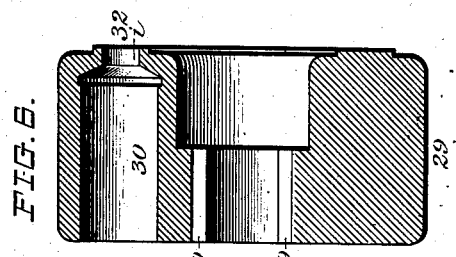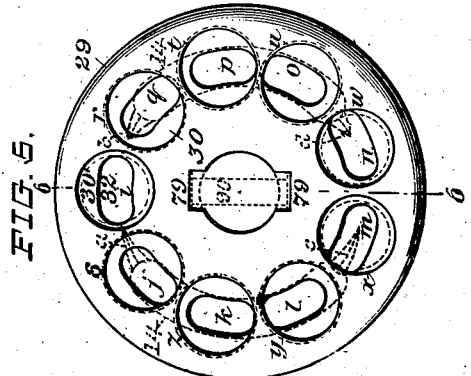

R. JANNEY.
VARIABLE SPEED TRANSMISSION DEVICE.
APPLICATION FILED JULY 9, 1906.
924,787.
Patented June 15, 1909.
6 SHEETS—SHEET 4.
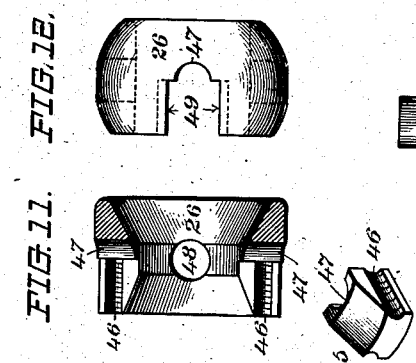
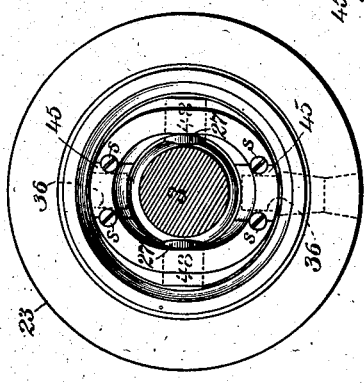
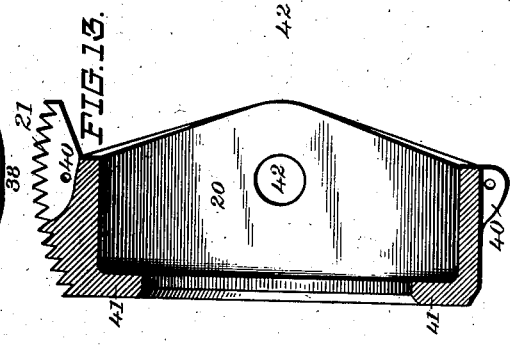
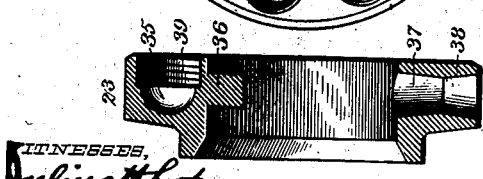
INVENTOR.
Reynold Janney
BY HIS ATTORNEYS.

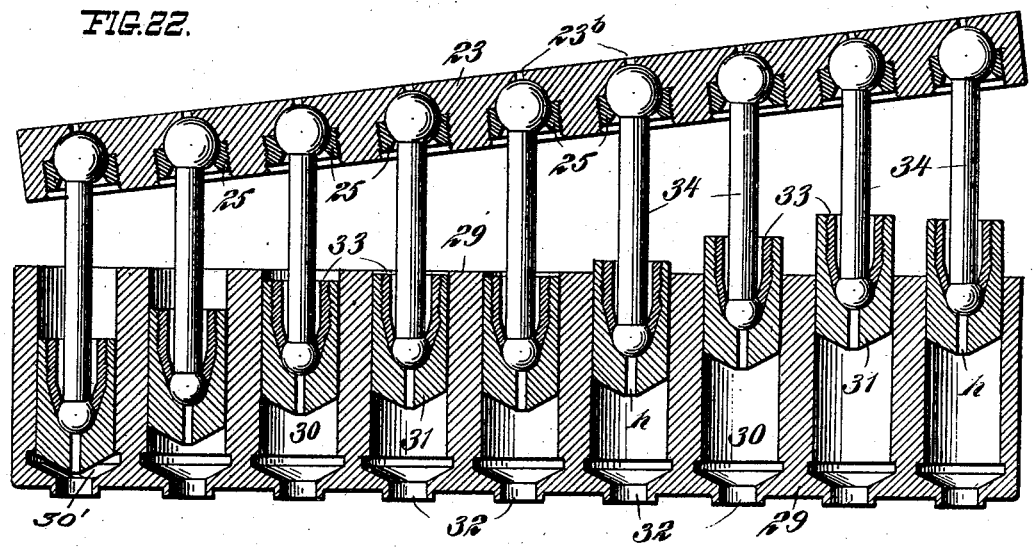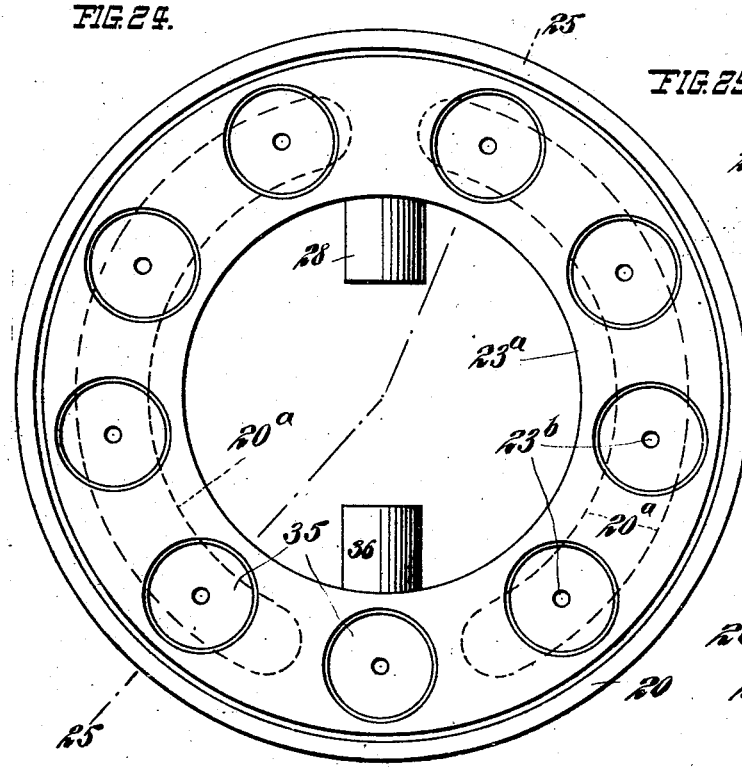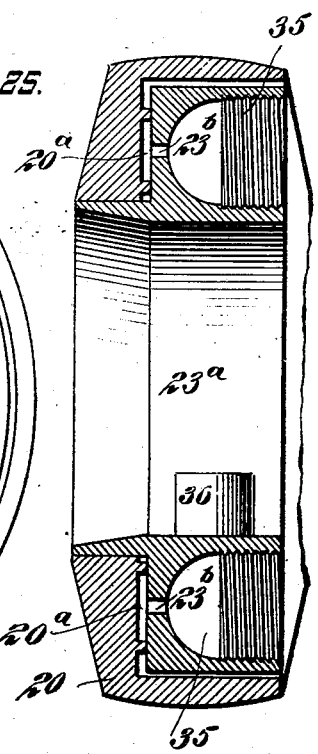

R. JANNEY.
VARIABLE SPEED TRANSMISSION DEVICE.
APPLICATION FILED JULY 9, 1906.

924,787.

Patented June 15, 1909.
6 SHEETS—SHEET 6.

WITNESSES
Julius H. Lutz
John Lotta

INVENTOR
Reynold Janney
BY
Biesen Knauth
ATTORNEYS

UNITED STATES PATENT OFFICE.

REYNOLD JANNEY, OF NEW YORK, N. Y., ASSIGNOR TO WATERBURY TOOL CO., OF WATERBURY, CONNECTICUT, A CORPORATION OF CONNECTICUT.

VARIABLE-SPEED-TRANSMISSION DEVICE.

No. 924,787.　　　　Specification of Letters Patent.　　　Patented June 15, 1909.

Application filed July 9, 1906. Serial No. 325,201.

*To all whom it may concern:*

Be it known that I, REYNOLD JANNEY, a citizen of the United States, and a resident of the borough of Manhattan, city, county, and State of New York, have invented certain new and useful Improvements in Variable-Speed-Transmission Devices, of which the following is a specification.

My invention relates to devices for the transmission of power, and particularly to such in which the speed of transmission may be varied gradually, the driving and driven parts of the device being a species of pump, and a body of fluid being employed to transfer the power from the driving set of pumps to the driven set.

My invention has for its object to provide various improvements with a view of rendering the action of the mechanism uniform, and, further, to simplify the construction in certain respects, to provide efficient bearings for certain parts, to adjust the driven member in a convenient way, and to provide certain other improvements as will be fully described hereinafter, and particularly pointed out in the appended claims.

Figure 23:
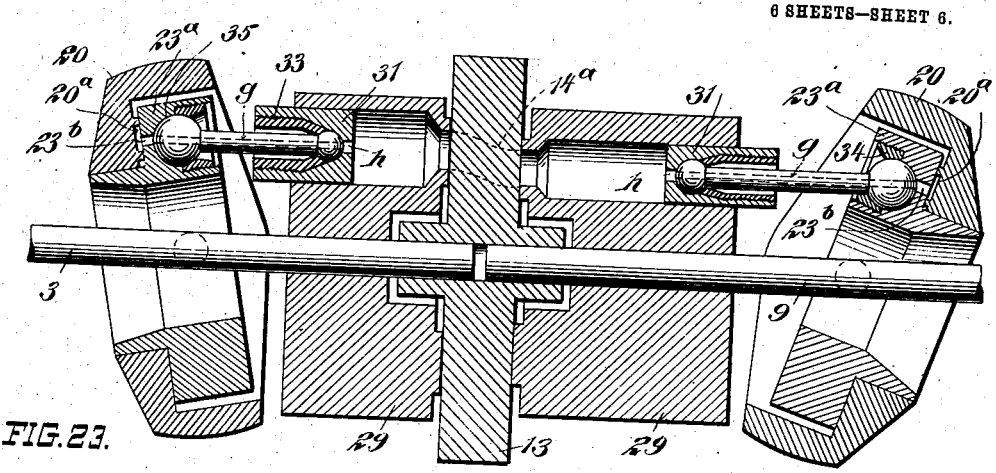
Figure 26:
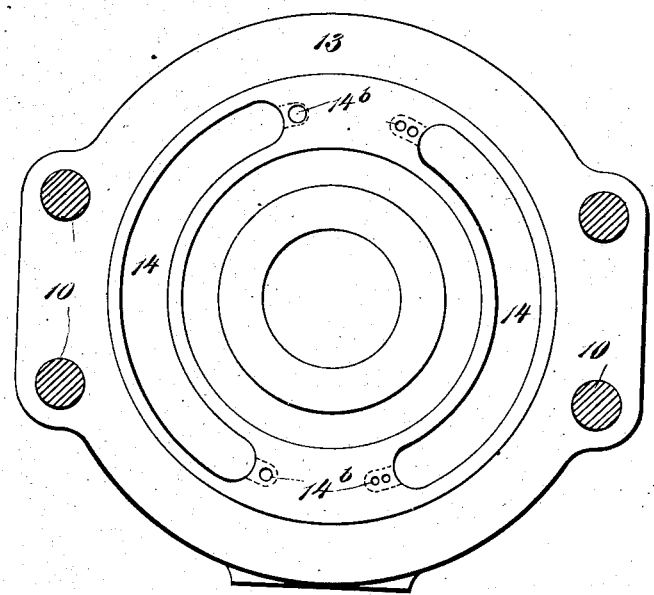
Figure 27:
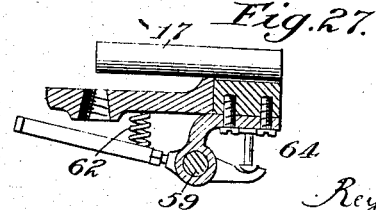

Reference is to be had to the accompanying drawings, in which Figure 1 is partly a side elevation, and partly a longitudinal section of an apparatus embodying my improvements. Fig. 2 is substantially a face view of the central part of the structure, or mid-plate as I call it, some parts of the mechanism being shown in section. Fig. 3 is a cross section on line 2—2 of Fig. 1, looking toward the left. Fig. 4 is a top view. Fig. 5 is a detailed face view, showing the pump barrel, or cylinder barrel. Fig. 6 is a cross section thereof on line 6—6 of Fig. 5. Fig. 7 is a view of the same cylinder looking from the opposite end. Fig. 8 is a detailed section of the socket ring. Fig. 9 is a face view of said ring with a part in section. Fig. 10 shows the socket ring in connection with the universal joint which connects it with the shaft. Fig. 11 is a vertical section of the universal joint ring interposed between the socket ring and the shaft. Fig. 12 is a side elevation of said ring. Fig. 13 is a sectional elevation of the tilting box. Fig. 14 is a face view thereof. Fig. 15 is a perspective view of a bearing block used in conjunction with the ring shown in Figs. 11 and 12. Figs. 16 and 16ª are a side elevation and a bottom view, respectively, of a scroll employed for adjusting the tilting box. Figs. 17 and 17ª are two sections taken at a right angle to each other through one of the relief tubes which I employ to reduce vibration. Fig. 18 is a horizontal section of certain parts, showing chiefly the mid-plate, one of the pump barrels and the connection of the relief tubes. Fig. 19 is a perspective view of a key forming part of a joint between the shaft and the pump barrel. Fig. 20 is a perspective view of a sleeve employed in conjunction with the trunnion of the socket ring. Fig. 21 is an end view of a retaining sleeve used in connection with a ball and socket, and Fig. 21ª is a longitudinal section thereof. Fig. 22 illustrates in a developed view a particular arrangement of the pump cylinders, pump pistons and the connecting rods which extend from the pistons to the socket ring. Fig. 23 is a longitudinal section of certain parts showing an improved way of constructing the bearings for the socket ring. Fig. 24 is a face view of the socket ring illustrated in Fig. 23. Fig. 25 is a cross section on line 25—25 of Fig. 24. Fig. 26 is a face view of the mid-plate showing particularly the arrangement of the ports therein and Fig. 27 shows a slightly different construction of a valve lever.

The apparatus comprises a casing made of two more or less cylindrical sections 1, suitably supported by legs, or the like, and embracing between them a mid-plate 13, these three parts being held together by means of bolts 10 and nuts 11. Preferably the mid-plate is provided with shoulders to fit the adjacent ends of the sections 1. Each of these sections is provided at its outer end with a bearing 2 for the shaft 3 or 9, respectively, each of these shafts passing through a box 5 containing packing 6, and provided with a cap 4 screwing on the outside of the bearing tube, and adapted to be locked by a guard 7, engaging teeth on the outside of the cap, and held by a screw 8.

The shafts 3 and 9 are practically alike, and, in fact, the two sections of the apparatus on opposite sides of the mid-plate 13 are practically alike, except as to certain mechanism hereinafter specifically described as used only on the driving section. In the following description I have, therefore, referred only to the one section of the device, but it will be understood that the same parts are provided on the other side of the mid-plate.

This mid-plate 13 is provided with two ports 14, which, in the arrangement shown, are to the left and the right, respectively, of a vertical line drawn through the center of the shaft. Through one of these ports the liquid, such as oil, passes from the driving part of the mechanism to the driven section, while the other port serves for the return of the oil. These ports are provided at their ends with extensions which are gradually reduced in area; for instance, as shown in Fig. 2, these extensions may consist of V-shaped channels $a\ b\ c\ d$, cut in the face of the mid-plate. These mid-plate ports 14 are adapted to register with the ports 32 on that face of the cylinder barrel 29 which is in contact with the mid-plate, and the provision of the extensions, such as $a\ b\ c\ d$, is for the purpose of securing a more gradual opening and closing of the passage from the cylinder port to the mid-plate port. This more gradual opening and closing of the passage insures a more even working of the mechanism.

The cylinder barrel 29 contains a number of cylinders 30 whose axes are parallel to that of the barrel, and which at one end are provided with the ports 32, which ports are smaller than the area of the respective cylinders, and are preferably lengthened in the direction of rotation, as shown in Figs. 5 and 7. Within the cylinders 30 are adapted to reciprocate the pistons 31, each provided with a socket to receive the rounded end of a connecting rod 34, the other rounded end of which is received in a socket of the socket ring 23. Screw-threaded retaining sleeves 33 and 25, respectively, are employed to hold the ends of the connecting rods 34 in their respective sockets.

In order to secure a good lubrication the pistons 31 are preferably provided with oil channels $h$, which connect with similar channels $g$ in the connecting rods so that oil from the cylinder may pass through the piston and through the connecting rod oiling both ends thereof.

The socket ring 23 is provided at one side with a radial trunnion pin 36, and at the opposite side with an aperture 37 adapted to receive a trunnion pin 28, the outer end of which is screw-threaded to receive a split nut 82, which fits into a tapering socket 38 at the outer end of the opening 37. The two trunnions formed by the pins 36 and 28 are received within sockets or bearings 47, which are formed partly on the universal joint ring 26 and partly on bearing blocks 45 (see Figs. 11, 12 and 15). This sectional construction is employed in order to allow the parts to be readily assembled and dismembered. The bearing blocks 45 are held in position by means of screws $s$ fitted into the registering screw-threaded channels 46. The universal joint ring 26 is also provided with sockets 48, arranged at right angles to the sockets 47, and adapted to receive trunnions 27 which are projected from the shaft 3.

The ring 23, which has sockets 35 to receive the ends of the connecting rods 34, is mounted to turn on a track or guide formed by balls 24 which run in a race 22 carried by the ring or box 20. This ring or box is pivoted to the section 1 by means of screws 74, or other suitable trunnions, which are arranged in such a manner that the three axes formed by the trunnions 74, the trunnions 27 and the trunnions 36, 28, will intersect at the same point. The ring 20 is provided with teeth 21, engaging teeth 44 on a scroll disk 43, the stem 50 of which passes through a suitable stuffing box, 52, and is provided with mechanism for rotating it, for instance a handwheel 51. The scroll disk 43 is thus mounted to turn in a plane approximately tangential to the path of the teeth 21 of the guide ring 20. The stem 50 may be provided with a channel 80, provided for the escape of air from the casing while the machine is being filled with liquid, but normally closed at the outer end by a screw 81. It will be understood that by turning the handwheel 51 the inclination of the ring or box 20, and of the race 22, may be altered, thus changing the speed of the opposite or driven member. Obviously, when the race 22 is perpendicular to the shaft 3, the pistons 31 will not move at all in the cylinders 30, and the barrel 29 will rotate idly. The greater the inclination of the race 22, the longer will be the stroke of the pistons 31, and the greater therefore, the speed of the driven member.

I have found it desirable in some cases to cushion the box 20, and as shown in Fig. 1, this may be accomplished by means of rods 19 pivoted to said box at 40, and also pivotally connected with plungers 18 located in cylinders or dash pots 17 which are provided with vents $v$ at their ends.

The cylinder barrel 29 is fitted to the inner end of the shaft 3 or 9 by means of a keyway 79 cut into the barrel at opposite sides of the shaft for the reception of a key 91, shown in detail in Fig. 19, having an opening 92 for the reception of the pin 90, passing through the shaft, the key being beveled toward both ends as shown. Thus at the ends of pin 90, a bearing point between the shaft and the barrel is obtained which permits the barrel to rock slightly, and thus to accommodate itself to any irregularity which might exist in the face contact of the barrel with the mid-plate 13. This contact preferably takes place on a raised annular surface only, as clearly shown in Fig. 1, a space $29^a$ being left at each side of the annular surface between the end face of the barrel and the adjacent face of the mid-plate. This is done for the purpose of reducing as far as possible the separating tendency exerted by any oil which may leak under pressure between the adjacent faces of the barrel and the mid-plate. As soon as such oil reaches the outer space 29ª, it can no longer exert any pressure. A screw collar or nut 93 is provided on the shaft to keep the barrel connected with the shaft when the machine is taken apart. The apparatus is filled with oil in any suitable manner, for instance, through a filling opening 12, and, when it is desired, the oil may be drained off through openings normally closed by plugs, such as 75.

In order to keep the scroll 44 in engagement with the teeth 21 of the tilting box 20, I provide a block 70 engaging the scroll adjacent to its point of contact with the teeth 21, and pressed inward by a spring 71, the tension of which may be adjusted by means of a screw 72, and locked after adjustment by means of a nut 73.

The relief tubes 16, shown in Figs. 2, 17, 17ª and 18, are employed for the purpose of taking up and equalizing slight pulsations or vibrations in the two ports 14 of the mid-plate, which vibrations arise from the volumetric variations in the combined action of the pistons due to the universal joint connection between the shaft and socket ring and to the angular position of the socket ring combined with a finite number of cylinders. For this purpose the tubes 16 are made of elastic metal in substantially the same manner as the well known oil can, and they are connected with the ports 14 by means of channels 77, the outer ends of which are normally closed by plugs 78.

It is advisable to provide some means for replenishing the supply of circulating fluid, since some leakage will always occur at the joint of the cylinder barrels with the mid-plate. For this purpose I have provided at the bottom of the structure a port 67 on each side of the central plane, through which ports the two halves of the apparatus are connected with each other. Each port leads into a chamber 95, normally closed by a plug 64, and communicating with the adjacent port 14 of the mid-plate by means of a channel 95ª. A valve 65, opening inwardly, is interposed in the connection from the chamber 95 to the mid-plate port. Thus the valve 65 will close on that side of the apparatus on which the pressure is high, but on that side on which the liquid returns to the driving section, or, in other words, on the suction side of the device, the valve 65 will be caused to open automatically in case there should be a deficiency in the amount of oil within the cylinders 30, and the deficiency will in such case be supplied through the port 67 from the oil which is contained at the bottom of the shell 1.

The driving portion of the device and the driven section may be exactly alike, although it is not necessary that the box 20 of the driven section should be adjustable. Therefore, in many cases, the box 20 on the driven side of the apparatus might be held fast at a predetermined angle best suited for the particular requirements of the case.

In some cases it is desirable to be able to rotate either of the shafts independently of the other, even when one or both of the tilting boxes 20 stand at an oblique angle to the shaft 3 or 9. In such event it becomes necessary to provide means for opening both check valves.

The device shown in the drawings for opening the check-valves 65 consists of a lever 55 mounted on a rock shaft 59, which is also provided with arms 60 pressed down by springs 62, and adapted to raise rods 63, the ends 66 of which will then lift the valves 65 off their seats. The rods 63 are suitably guided through the plugs 64. It is not advisable to open the valves while the driven member is being rotated at a high speed, and I have, therefore, added a safety device which allows the valves 65 to be lifted only when the driving member is at the neutral point, at which the driven member is stationary. By looking at Figs. 1 and 4 it will be seen that end 56 of the lever 55 is normally stopped by the rim of the hand-wheel 51, and cannot move inward to lift the check-valves 65, except when a slot 53 of the hand-wheel registers with the lever end 56. This slot is so arranged that at the time of its registry with the lever the race 22 is perpendicular to the shaft 3, or, in other words, the apparatus is in its neutral position when the pistons 31 of the driving section have no reciprocating motion. The lever 55 works in a guide bracket 58, and has a stop pin 57. The wheel 51 does not turn a complete rotation in either direction so that the slot 53 will not be presented to the lever 55 except when the tilting box is in its neutral position.

A spring 94 presses the cylinder barrel 29 against the mid-plate, and thus preserves a tight joint even before the pistons 31 begin to reciprocate. During the reciprocation of the pistons the fact that the cylinder ports 32 are smaller than the cross section of said cylinders produces a pressure forcing the cylinder barrels against the mid-plate. Lubrication of the shafts 3 and 9 is effected by means of channels $e$, $f$ and $f'$.

In Figs. 5 and 7 I have indicated the ports 32 of the several cylinders by the letters $i$, $j$, $k$, $l$, $m$, $n$, $o$, $p$ and $q$, while the cylinders themselves are designated in Fig. 5 as $r$, $t$, $u$, $w$, $x$, $y$, $z$, $s$ and 30. The cylinders are evenly spaced, but the ports are not, the port $i$ being placed symmetrically to its cylinder 30, but the other ports are located to one side or the other of the cylinder center. Those cylinders which are at the same distance from the cylinder 30 have their ports similarly located with reference to their neighbors, thus port $q$ is at the same distance from the ports *i* and *p* respectively, as the port *j* is from the ports *i* and *k* respectively. It will also be observed that the number of cylinders, pistons and ports connected therewith, is odd, being nine in the particular case shown. This is of great importance in securing a smooth working of the mechanism. It will be understood that in operation one half of the device, which is the half on which the pistons 31 of the driving section move toward the mid-plate, is under pressure, the other half being under suction. The total pressure is a resultant of the individual pressures, and what may be termed the center of pressure, that is, the point through which the resultant would pass, obviously shifts suddenly each time one of the cylinder ports comes into or out of communication with one of the mid-plate ports. With an odd number of pistons the change is not so great, inasmuch as the coming into registry of the said ports is not simultaneous with the coming out of registry of some other cylinder port. I find that with nine cylinders, as shown, being an odd number, I obtain an action which is practically just as uniform as would be obtained with the even number, eighteen.

In Fig. 22 I have illustrated in a developed view another expedient for correcting the volumetric irregularities. For this purpose the connecting rods may be made of different lengths, those connecting rods belonging to cylinders occupying the same relation to the median cylinder 30' (shown at the top in Fig. 5 and at the extreme left in Fig. 22), being made of equal lengths. The result will be that the pistons will have their strokes slightly increased or diminished, inasmuch as the stroke of each piston is not equal to the movement of the socket ring end of the connecting rod lengthwise of the shaft, but depends also on the angular or swinging motion of the connecting rod.

The circle of cylinders 30 may be of a different diameter from the circle of sockets 35, and in practice the circle of sockets is made larger, as is shown clearly in Fig. 1.

A bushing 99 may line the shaft bearing in the mid-plate 3, and a fiber disk or washer $99^a$ may be interposed between the shaft ends to take up end thrust.

In Figs. 23, 24 and 25 I have illustrated a construction by which the balls 24 and race 22 may be dispensed with. The socket ring $23^a$ is shown provided with channels $23^b$, which lead from the sockets 35 to that surface of the socket ring which is adjacent to the box 20. The corresponding surface of the box is made with recesses $20^a$, and as the pistons 31 are reciprocated the oil passing through the channels *h* and *g* is also forced through the ports $23^b$ into the chambers $20^a$, and thus forms a fluid-bearing under pressure, which is almost as efficient as the ball bearing shown in Fig. 1. Fig. 23 also shows another feature which relates to making the two sections of the apparatus of different dimensions as regards the cylinders. In the form of my invention so far described, it has been assumed that the barrels, cylinders and socket rings of both sections are absolutely alike. In Fig. 23, however, the cylinders on the driving side, which is shown at the left, are made of a larger diameter, but shorter, than those on the right, and the pistons are formed correspondingly. The ports $14^a$ of the mid-plate are in this case bent or inclined to properly connect the two sections of the device. I have found that with this arrangement a greater range of speed changes is obtainable on the driven side than when both sections of the apparatus are alike. Another advantage of this construction is that by shortening the stroke on the driving end the cylinders on the suction side will re-fill more readily; if long stroke pistons were employed the motion might be so rapid that atmospheric pressure would have no time to replenish the cylinders. Therefore, with a short stroke on the driving end, a higher number of revolutions can be used on the driving section.

I have referred to the V-shaped extensions *a*, *b*, *c* and *d*, at the ends of the mid-plate ports 14, and in Fig. 26 I have shown a somewhat different construction, which may be employed for the same purpose. Here an extension is cut into the metal of the mid-plate at the end of each port 14, and from this extension an opening $14^b$, or a number of such openings, is provided to that face which is engaged by the rotary barrel. They produce the same effect as the V-shaped grooves of Fig. 2. Fig. 26 also shows that the reduced extensions of the mid-plate ports 14 may be different from each other, this being also done for the purpose of equalizing the action of the device. While the V-shaped grooves *a*, *b*, *c* and *d*, are alike in Fig. 2, they might be made different from each other (see Fig. 5.) so as to secure the same effect as in Fig. 26. Another feature shown in Fig. 26 is the shifting of one or both of the mid-plate ports or preferably the mid-plate lands between the ports relatively to the median plane, which is a plane passing through the shaft 3 and perpendicular to the plane of rotation of the socket ring 23, or to the plane of the track or race 22. The object which I pursue by this shifting of the mid-plate ports or lands is to compensate for the lag or inertia of the oil in filling the cylinders whereby a vacuum might be produced and a cylinder pass across the land to the high pressure side only partially filled. Shifting the ports, or what amounts to the same thing, shifting the lands, also modifies the shifting of the resultant center of pressure as the cylinders enter and leave the high pressure side.

In order to allow air to escape from the cylinder 30 during the filling of the machine with oil, I provide ports 94 leading through the mid-plate 13 and communicating by channels 94ª with the ports 14. The communication is normally closed by screw plugs 54, the ends of which are removed from their seats only when it is desired to fill the apparatus. During the filling operation, air will escape into the shells 1 through the channels 94ª and ports 94, and from the shells through the channel 80. It may also be desirable to provide safety valves so that an excessive pressure within the cylinders 30 may be relieved. Thus the plugs 78ª (Fig. 2) closing the ends of the channels 77, may be formed as guides for the stems 96ª of safety valves 96 normally held by springs 97 against seats so as to close the communication from the ports 14 to ports 98, through the channels 77. In case of excessive pressure the valves 96 will open, allowing oil to escape into the shells 1 through the ports 98.

While I have illustrated springs 62 having a tendency to keep the lever 55 out of the slot 53 of the wheel 51, springs having the contrary tendency might be employed (see Fig. 27), so that whenever the wheel 51 reaches the neutral position, the lever 55 would snap into the slot 53 and lock the wheel 51; this would avoid all danger of an accidental starting of the mechanism.

I have described my invention as applied to a variable speed gear composed of a driving section and a driven section. The driving section may be termed a pump, and the driven section a motor driven by said pump. It will be seen that each of these sections is "reversible" in function, that is, it may either be used as a pump, to propel a fluid, or it may be driven by a fluid under pressure. Of course, each section is fully operative by itself, thus I might remove all the parts shown on the right of the mid-plate, and use the remaining apparatus as a pump, one of the ports 14 forming a suction port and the other a delivery port; or the same apparatus might be used as a motor, by admitting a fluid under pressure through one of the ports 14, and using the other as an exhaust port.

I claim:

1. The combination of the stationary member having ports for the passage of the fluid, a rotary barrel having an odd number of cylinders with ports adapted to register with those of said stationary member, pistons in said cylinders, and a rotary inclined member connected with the pistons.

2. The combination of the stationary member having ports for the passage of the fluid, a rotary barrel having cylinders with ports adapted to register with those of the stationary member, pistons in said cylinder, a shaft, a universal joint ring pivoted to the shaft and provided with bearings in a line perpendicular to the pivotal axis connecting said ring with the shaft, an outer ring having a trunnion pin fitted into one of said bearings, and an alining opening having a tapering portion, a trunnion pin fitted into said opening and into the other bearing of the universal joint ring, means for holding said trunnion pin on the outer ring, means for holding the outer ring in an inclined position, and rods connecting the pistons with said outer ring.

3. The combination of the stationary member having ports for the passage of the fluid, a rotary barrel having cylinders with ports adapted to register with those of the stationary member, pistons in said cylinder, a shaft, a universal joint ring pivoted to the shaft and provided with bearings in a line perpendicular to the pivotal axis connecting said ring with the shaft, an outer ring having a trunnion pin fitted into one of said bearings, and an alining opening which tapers from both ends toward the center, a trunnion pin having a tapered portion fitted into the inner portion of said opening and also having end portions one of which is screw-threaded while the other fits into the other bearing of the universal joint ring, a split bushing or nut screwing on the threaded end portion of said trunnion pin and tapered to correspond to the outer portion of said opening, means for holding said outer ring in an inclined position, and rods connecting the pistons with said outer ring.

4. The combination of the stationary member having ports for the passage of the fluid and a chamber for containing a supply of fluid, connected with said ports, check valves controlling the connection of the said chamber with the said ports and opening toward the ports, a mechanical means for opening the check valves, a rotary barrel having cylinders with ports adapted to register with those of the stationary member, pistons in said cylinders, and a rotary inclined member connected with said pistons.

5. The combination of the stationary member having ports for the passage of the fluid and a chamber for containing a supply of fluid, connected with one of said ports, a check valve controlling the connection of said chamber with said port and opening toward the port, mechanical means for opening said valve, a rotary barrel having cylinders with ports adapted to register with those of the stationary member, pistons in said cylinders, and a rotary inclined member connected with said pistons.

6. The combination of the stationary member having ports for the passage of the fluid and a chamber for containing a supply of fluid, connected with one of said ports, a check valve controlling the connection of said chamber with said port and opening toward the port, mechanical means for opening said valve, a rotary barrel having cylinders with ports adapted to register with those of the stationary member, pistons in said cylinders, a rotary inclined member connected with said pistons, an adjusting device for changing the inclination of said member, and a stop device for said mechanical means, connected with the adjusting device in such a manner that said means may be operated only in a predetermined position of the adjusting device.

7. The combination of the stationary member having ports for the passage of the fluid and a chamber for containing a supply of fluid, connected with one of said ports, a check valve controlling the connection of said chamber with said port and opening toward the port, mechanical means for opening said valve, a rotary barrel having cylinders with ports adapted to register with those of the stationary member, pistons in said cylinders, a rotary inclined member connected with said pistons, a wheel having connections for adjusting the inclination of said member and provided with a slot which in one position of the wheel allows the said mechanical means to be operated, while in any other position of the wheel said wheel prevents the operation of said mechanical means.

8. The combination of the stationary member having ports for the passage of the fluid and a chamber for containing a supply of fluid, connected with one of said ports, a check valve controlling the connection of said chamber with said port and opening toward the port, mechanical means for opening said valve, a rotary barrel having cylinders with ports adapted to register with those of the stationary member, pistons in said cylinders, a rotary inclined member connected with said pistons, an adjusting device for changing the inclination of said member, a wheel for operating said adjusting device, and stop mechanism for limiting the throw of the wheel.

9. The combination of the stationary member having ports for the passage of the fluid, the shaft having a pin projected therefrom, tapering keys held by said pins, a rotary cylinder barrel having keyways for said keys and adapted to rock thereon, said barrel being provided with cylinders having ports adapted to register with those of the stationary member, pistons within said cylinders, and a rotary inclined member connected with said pistons.

10. The combination of the stationary member having ports for the passage of the fluid, the rotary barrel arranged to engage said member and provided with cylinders having ports adapted to register with those of said stationary member, a shaft connected with said barrel by a joint which allows the barrel to rock relatively to the shaft, pistons within said cylinders, and a rotary inclined member connected with said pistons.

11. The combination of the stationary member having ports for the passage of the fluid, the rotary barrel adapted to engage said member and having a central opening with longitudinal keyways, said barrel also having cylinders with ports adapted to register with those of the stationary member, a shaft having a pin and keys held by said pin and fitted into the keyways of the barrel so that the latter can slide and also rock on said keys, a spring engaging the shaft and the barrel to press the latter toward said stationary member, pistons within the cylinders, and a rotary inclined member connected with said pistons.

12. The combination of the stationary member having ports for the passage of the fluid, the rotary barrel provided with cylinders having ports adapted to register with those of said stationary member, pistons within said cylinders, a rotary inclined member connected with said pistons, a normally stationary guide for said inclined member, provided with teeth, a rotatable scroll disk engaging the teeth of the guide, a block engaging said scroll disk adjacent to its meshing portion, and means for pressing said block toward the scroll disk.

13. The combination of the stationary member having ports for the passage of the fluid, the rotary barrel having cylinders with ports adapted to register with those of the said member, pistons in said cylinders, a rotatable inclined member connected with said pistons, a track for said member, and means for injecting a liquid between the inclined member and its track.

14. The combination of the stationary member having ports for the passage of the fluid, the rotary barrel having cylinders with ports adapted to register with those of said member, pistons located in said cylinders and provided with longitudinal ducts, a rotary socket ring provided with ducts leading from its sockets, an inclined track for said ring, on that side to which the ducts lead, and hollow connecting rods extending from said pistons to the sockets of the socket ring.

15. The combination of the stationary member having ports for the passage of the fluid and a chamber adapted to contain a supply of such fluid, connected with one of said ports, a check valve controlling the connection of said chamber with said port, a spring-pressed lever having connections for moving said valve off its seat, a rotary barrel having cylinders with ports adapted to register with those of the stationary member, pistons in said cylinders, a rotary member connected with said pistons, an inclinable track for said rotary member, and a wheel for adjusting the inclination of said track, and provided with a slot into which said lever is adapted to snap in the neutral position of the wheel, to lock the latter and at the same time move the check valve off its seat.

16. The combination of the stationary member having ports for the passage of the fluid, and vent channels connected with said ports, means for normally closing said vents, the rotary barrel having cylinders with ports adapted to register with those of the said member, pistons in said cylinders, and a rotary inclined member connected with the pistons.

17. The combination of the stationary closed casing provided with ports for the passage of the fluid, the rotary barrel having cylinders with ports adapted to register with those of the said casing, pistons in said cylinders, a rotary inclined member connected with the pistons, a wheel for adjusting the inclination of said member, said wheel being provided with a stem projecting from the outside of the casing to the interior thereof and provided with a vent, and means located on the outside of the casing for closing said vent.

18. The combination of the stationary member having ports for the passage of the fluid, valved replenishing channels connected with the lower portions of said ports, relief channels connected with the central portions of said ports, safety valves controlling said relief channels, vents connected with the upper portions of said ports, means for normally closing said vents, the rotary barrel having cylinders with ports adapted to register with those of the said member, pistons in said cylinders, and a rotary inclined member connected with the pistons.

In testimony whereof I have hereunto signed my name in the presence of two subscribing witnesses.

REYNOLD JANNEY.

Witnesses:
ROBERT S. BROWN,
HORACE G. HOADLEY.